Patented Oct. 19, 1937

2,095,982

UNITED STATES PATENT OFFICE 2,095,982

MAGNESIUM OXIDE PRODUCTS AND PROCESS OF MAKING THE SAME

John Allen Heany, New Haven, Conn., assignor to Edward J. Brennan, New Haven, Conn.

No Drawing. Application July 26, 1934, Serial No. 737,060

14 Claims. (Cl. 25—156)

This invention relates to a novel composition of matter and to the method for producing the same. In its more specific aspect the invention is directed to an improved article of manufacture of the ceramic type, produced with magnesium oxide or the like as the major constituent thereof and to a relatively inexpensive method for producing the same. More particularly the invention is concerned with the preparation of a magnesia or the like ceramic that is dense, non-porous, vitreous and strong, and is comprised of a pseudo non-crystalline mass. The products which have been prepared in accordance with the invention find especial application in the super-refractory, insulation and other fields.

An object of the invention is a novel composition of matter composed chiefly of magnesium oxide, or the like, and is dense, non-porous, vitreous and strong.

Another object of my invention is an article of manufacture of predetermined configuration and composed principally of magnesium oxide or the like and is dense, non-porous and vitreous and has substantially the same physical characteristics throughout the thickness thereof.

A further object of the invention is an improved method for manufacturing a dense, vitreous and non-porous article composed chiefly of magnesium oxide or the like.

A still further object of my invention is an improved method where temperatures below 1700° C. may be employed in the production of a non-porous and vitreous article consisting chiefly of magnesium oxide or the like.

In accordance with my invention a predetermined quantity of an alkaline oxide, such as magnesium oxide is mixed with a predetermined quantity of a weakly acid oxide such as silicon dioxide. In the course of my experimentations I have found that the quantity of silica should be a small percentage of the mixture because too much silica will reduce the refractoriness of the final product. Too little silica will, however, increase the cost of the firing steps. The best results are obtained by having the above mixture consisting of about

| | Parts |
|---|---|
| Magnesia | 95 |
| Silica | 5 |

The silica is added in two separate treatments or mixing operations, 2% in the first treatment and 3% in the second. The first mix therefore consists of

| | Parts |
|---|---|
| Magnesia | 98 |
| Silica | 2 |

The above admixture is placed in a ball mill or other pulverizer and subjected to a grinding and mixing action until the entire mass is intimately admixed, homogeneous throughout and in the form of an extremely fine powder, with both the silica and magnesia being in a very fine state of subdivision. The grinding and mixing time obviously is variable depending upon the size of the ball mill or other pulverizer, the quantity of charge, and the original size of the individual particles of the charge.

The milling may be either dry or wet depending upon which is found more suitable in each individual case. In the wet method, for example, the material is placed in a ball mill and water added during the grinding and mixing. After the charge of silica and magnesia has been reduced to the very fine state of division, the sludge may be allowed to settle in a decantation tank and the supernatant liquor is decanted therefrom. Thereafter the wet mass may be filtered in a filter press and the cake dried.

The dry intimate admixture of very finely divided silica and magnesia, whether obtained by following either the wet or dry grinding steps, is placed in a crucible or extruded in small rods about one-quarter or one-half inch in diameter. The mass is then placed in a gas-air furnace where the same is heated to approximately 1500° C. or other temperature below the fusion temperature of magnesium oxide or silica but usually between 1400° C. and 1600° C., the time period depending on the size of the furnace and the amount of the charge, but in general being equivalent to that usual to ceramic processes.

This operation results in vitrification of the mass accompanied by substantial shrinkage of the material to the extent of about 70%, and because of the small diameter of the rods may be easily broken and pulverized in the second treatment as hereinafter described.

The thus fired mass is removed from its container and broken up and thereafter and together with three parts of silica is placed into a ball mill or other pulverizer. The charge now in the ball mill is:

| | Parts |
|---|---|
| First fired product composed of 98 parts MgO plus 2 parts SiO$_2$ | 97 |
| SiO$_2$ | 3 |

The charge is milled or pulverized either wet or dry until it is reduced to a powder having its particles in a very fine state of subdivision and intimately and homogeneously admixed with each other. The air float system is preferably employed in order that a very fine powder may be obtained without anything but fines. It is preferable to employ a dry grinding because if water were employed in a wet grinding, shrinkage in the next firing step would be high. However, it is feasible to employ a wet grinding step employing a liquid hydrocarbon, such as naphtha, carbon tetrachloride, kerosene or other inert liquid having a medium or low vapor pressure, as the wetting agent. If the wet grinding with a hydrocarbon is employed, after suitable grinding, the hydrocarbon is removed therefrom in any suitable manner.

Since the air float method is the cheaper and easier to employ I prefer this method and, the fine powdery mixture obtained therefrom may be formed into articles of the desired shapes and sizes by utilizing either the "slip" method, extrusion, moulding powder in dies under pressure, or by forming the powder into a plastic mass or moulding under pressure and working the same on a potter's wheel. In order to prevent the air floated mixture, containing magnesium oxide from combining with water, a naphtha or other appropriate hydrocarbon may be added thereto. A cellulosic or other organic binder such as starch or dextrine may be employed in any one of the above steps if desired.

After forming the articles by any of the above mentioned processes, the articles are dried and then placed in a kiln and fired for a time limit depending on the size of the charge and dimensions of the furnace, the temperature during this operation not exceeding 1600° C. which is much lower than temperatures heretofore employed in the manufacture of magnesia refractories at a temperature between 1400° C. and 1600° C. The articles are allowed to remain in the kiln at these temperatures whereby the oxides frit and vitrify until the mass becomes substantially completely vitrified, dense, non-porous, very coherent and appears somewhat translucent when in thin sections and will withstand practically the same temperature as pure magnesium oxide. It is my belief that the small amount of slightly acid oxide such as silica has an effect similar to a catalyst and forms some special compound which frits easily without losing strength and forms in such a way that porosity does not result.

In this second firing treatment the shrinkage is greatly reduced over that of the first treatment, being as low as 6% and not exceeding 15%, the shape of the article remaining the same. The mass of said article is substantially homogeneous and of the same physical characteristics throughout the thickness thereof.

The articles thus prepared may be fired in the ordinary commercial kilns where a moderate temperature of approximately 1500° C. prevails and the finished product has all of the superior characteristics of glazed ware and in addition any deterioration of the outer surface thereof is not very noticeable because the structure of the interior is the same as the original outer surface after firing.

Although I have found that the best results are obtained with a composition consisting of 95% magnesium oxide and 5% silica, I have found that good results may be obtained using 97% magnesia and 3% silica. The magnesium oxide content may be reduced to 80% and the silica content increased to 20%, but this composition has its characteristic of refractoriness considerably reduced although it retains the other advantages. As the percentage of magnesium oxide increases above 95% the temperature of vitrification increases rapidly and with it the cost of production without any resultant advantages.

Also while the two step process above described has been found most effective in that shrinkage in the second and article forming treatment is brought down to percentages usual in ceramics, it is possible for certain products to employ a single treatment mixing the materials initially in the proportions of 95% magnesia and 5% silica. However, because of the high shrinkage factor I prefer the two step process.

Although the invention has been described with some particularity, it is not to be limited to the exact features set forth because it is subject to numerous obvious modifications to one skilled in the art, such as the substitution of a compound including magnesium and another including silicon, which if subjected to the first firing step will yield magnesia, silica and a volatile constituent. It is to be understood that the two-step process above described is applicable to other refractories where there is an excessive amount of shrinkage in the ceramic process.

What I claim is:

1. The method for producing a dense, non-porous, vitreous, strong, pseudo non-crystalline refractory body of finely divided magnesia including the steps of admixing magnesium oxide and a slightly acid oxide, with the quantity of said acid oxide being very small as compared to the quantity of said magnesium oxide, and heating the same to a temperature between 1400° C. and 1600° C., said magnesium oxide constituting between 80% to 98% of the mix.

2. The method for producing a dense, non-porous, vitreous, strong, pseudo non-crystalline refractory body of finely divided magnesia including the steps of forming an admixture of finely divided magnesium oxide and silica, with the quantity of said silica being very small as compared to the quantity of said magnesium oxide, and firing said admixture to a temperature between about 1400° C. and 1600° C. to vitrify said admixture, said magnesium oxide constituting between 80% to 98% of the mix.

3. The method for producing a refractory body including the steps of forming an admixture of finely divided magnesium oxide and a small quantity of a slightly acid oxide, firing the admixture to vitrify the same, reducing said vitrified admixture to a fine state of subdivision, adding a small quantity of a slightly acid oxide thereto and forming a mixture therewith, firing said mixture until it becomes a strongly coherent, dense and vitreous mass.

4. The method for producing a refractory body including the steps of forming an admixture of finely divided magnesium oxide and a small quantity of silica, firing the admixture to vitrify the same, reducing said vitrified admixture to a fine state of subdivision, adding thereto a small quantity of silica and forming a mixture therewith, and firing said mixture at a temperature below the fusion point of either magnesium oxide or silica until the mixture becomes a substantially non-porous and strongly coherent mass.

5. The method for producing a refractory body comprising forming an admixture of finely divided magnesium oxide and a small quantity of silica and firing the same at a temperature between about 1400° C. and 1600° C. until the same has vitrified, reducing the same to a finely divided state, adding a small quantity of silica thereto and forming a mixture therewith, and firing said mixture at a temperature between about 1400° and 1600° C. until the same has become a strongly coherent, vitreous and dense mass.

6. The method for producing a refractory body comprising forming an admixture of about 98 parts finely divided magnesium oxide and about 2 parts of silica and firing to vitrify the same, reducing said admixture to a fine state of subdivision and adding thereto about 3 parts of silica and forming a mixture therewith, and firing to vitrify the same.

7. The method for producing a refractory body comprising forming an admixture of about 98 parts of finely divided magnesium oxide and about 2 parts of silica, firing the same at a temperature between about 1400° C. and 1600° C. to vitrify the same, reducing said admixture to a fine state of subdivision, adding about 3 parts of silica thereto and forming a mixture therewith, and firing said mixture at a temperature of between about 1400° C. and 1600° C. to form a strongly coherent, dense and vitrified mass.

8. The method for producing a dense, non-porous, vitreous, strong, pseudo non-crystalline refractory body of finely divided magnesia including the steps of forming an admixture of finely divided magnesium oxide and silica, with the quantity of said silica being small as compared to the quantity of magnesium oxide, and vitrifying said admixture by heating to a temperature not exceeding 1700° C. and exceeding 1400° C., said magnesium oxide consisting between 80% to 98% of the mix.

9. The method for producing a dense, non-porous, vitreous, strong, pseudo non-crystalline refractory body of finely divided magnesia including the steps of admixing magnesia with about 5 percent of silica, and heating the mixture to a temperature substantially below the fusing point of the magnesia and between about 1400° C. and 1600° C.

10. A dense, non-porous, vitreous, strong, pseudo non-crystalline refractory body of finely divided magnesia comprised chiefly of magnesium oxide and 2% to 20% of silica.

11. A dense, non-porous, vitreous, strong, pseudo non-crystalline refractory body of finely divided magnesia comprised chiefly of magnesium oxide and 3% to 10% of silica.

12. A dense, non-porous, vitreous, strong, pseudo non-crystalline refractory body of finely divided magnesia comprising about 95% MgO and 5% $SiO_2$, said body being dense, coherent, non-porous and vitreous.

13. A process of making a shaped refractory from finely divided ceramic materials subject to excessive shrinkage or firing which comprises forming the finely divided materials into a shape, firing it, disintegrating the fired mass, again forming it into a shape with the addition of a vitrifying catalyst and then repeating the firing process.

14. A process of forming a shaped refractory from finely divided ceramic materials which undergo a high degree of shrinkage when fired, which comprises forming an article from the finely divided ceramic materials, activating the ceramic materials, firing the ceramic materials so activated, disintegrating the fired ceramic, again activating the disintegrated materials and again firing.

JOHN ALLEN HEANY.